United States Patent [19]

Marks, Sr. et al.

[11] Patent Number: 4,885,855
[45] Date of Patent: Dec. 12, 1989

[54] ANTIBACTERIAL ATTACHMENT

[75] Inventors: George B. Marks, Sr., Hudson, Wis.; D. Michael Fearing, St. Paul, Minn.

[73] Assignee: Fearing Manufacturing Co., Inc., South St. Paul, Minn.

[21] Appl. No.: 721,126

[22] Filed: Apr. 8, 1985

Related U.S. Application Data

[63] Continuation of Ser. No. 427,742, Sep. 29, 1982, abandoned.

[51] Int. Cl.[4] .............................................. G09F 3/00
[52] U.S. Cl. ...................................................... 40/301
[58] Field of Search ................. 40/300, 301; 119/156; 128/330, 316; 604/890, 897, 308, 265; 424/28

[56] References Cited

U.S. PATENT DOCUMENTS

| 2,858,830 | 11/1958 | Robins | 604/308 X |
| 3,765,113 | 10/1973 | Magee | 40/300 |
| 4,195,075 | 3/1980 | Miller | 119/156 X |
| 4,265,876 | 5/1981 | Feakins | 40/300 X |
| 4,366,777 | 1/1983 | Akhavein et al. | 40/301 X |
| 4,479,795 | 10/1984 | Mustacich et al. | 604/265 X |

Primary Examiner—Michael H. Thaler
Attorney, Agent, or Firm—Jacobson and Johnson

[57] ABSTRACT

An animal tag for attachment to the flesh of an animal with the tag characterized by having a portion of the tag containing a film coating containing an antiseptic for release into a wound made in attachment of the tag to the flesh of the animal to thereby inhibit bacterial infection in the wound.

11 Claims, 1 Drawing Sheet

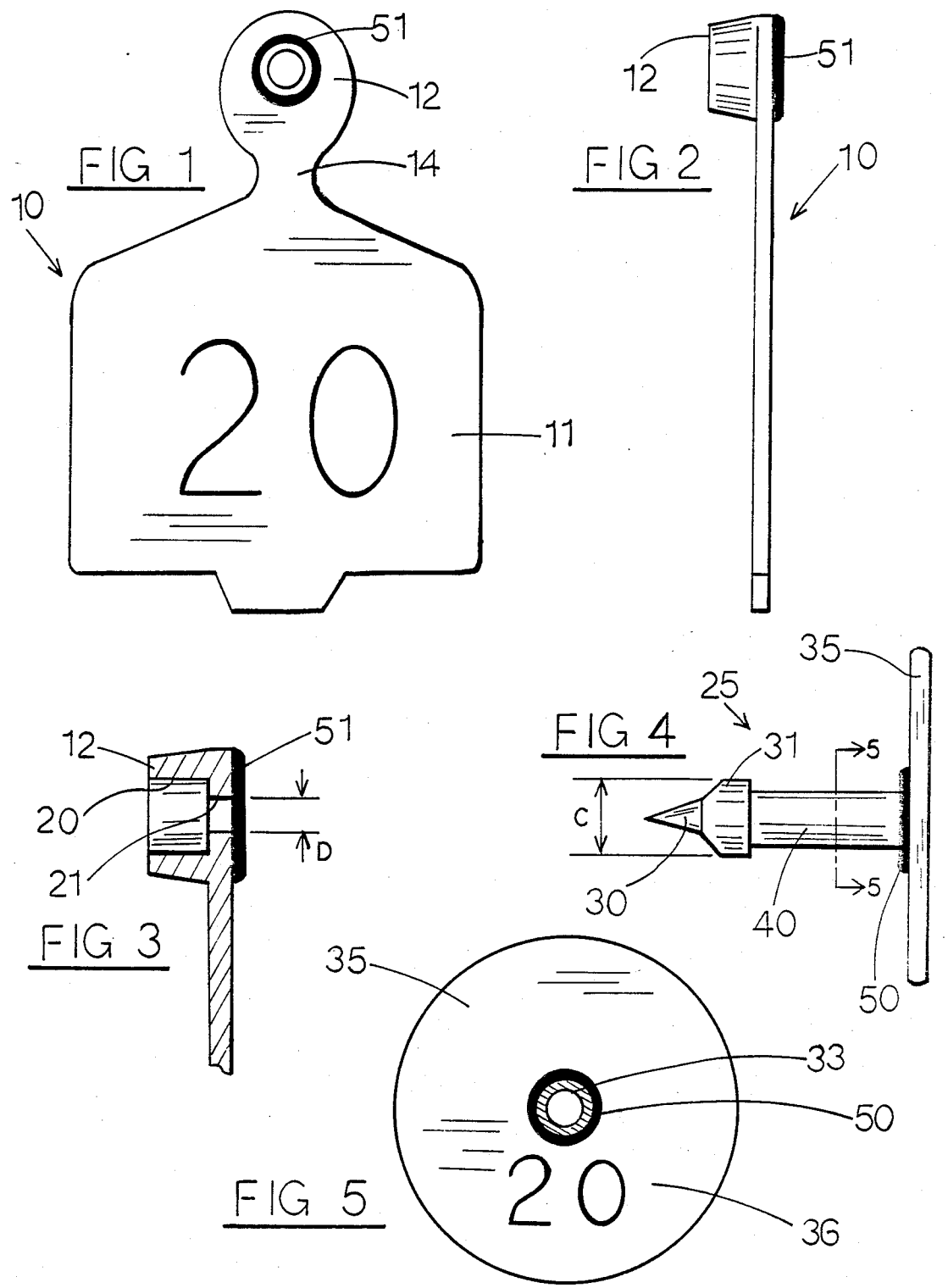

ANTIBACTERIAL ATTACHMENT

This application is a continuation of application Ser. No. 427,742, filed 9/29/82, now abandoned.

FIELD OF THE INVENTION

This invention relates generally to animal attachment members and, more specifically, to animal attachment members that require forming a hole in animals' ears or the like to attach the animal attachment member thereto.

BACKGROUND OF THE INVENTION

Typically, most animal attachment members such as insecticide tags or animal identification tags require forcing a sharp object through the animal's ear. In most cases the object either fractures of punches a hole in the animal's ear. Once an opening is made in the animal's ear, the ear tag is inserted into the opening or wound. One of the problems with ear tag insertions is that oftentimes bacterial infections occur in the wound. Generally, the infections are slow to heal due to the continued agitation of the wound by the movement of the tag in the wound. One may apply an antiseptic to the wound of course, but unless the antiseptic is applied immediately prior to insertion of the tag into the animal, the antiseptic loses its effectiveness. Consequently, in tagging animals usually no steps are taken to prevent infection since it is both difficult and inefficient to do so. The present invention provides for application of a carrier containing an antiseptic to the animal ear tag, the carrier being capable of withstanding the normal handling of tags prior to and during the application process.

DESCRIPTION OF THE PRIOR ART

The concept of ear tags having a compartment to hold a chemically treated strip to kill hog lice is shown in Meeks U.S. Pat. No. 3,949,708.

A device for controlling ear ticks is shown in Furer, et al. U.S. Pat. No. 4,059,074. The Furer, et al. patent shows a disc of sintered thermoplastic material impregnated with active ingredients comprising a solution of 2,2-dichlororvinyldimethyl phosphate. The disc is inserted into the ear tag spike to hold the active ingredient in place. The sintered thermoplastic material provides a carrier that produces a timed release of the insecticide.

Ritchey U.S. Pat. No. 4,184,453 discloses an ear tag which is impregnated with an insecticide repellent to control flies, lice and other insects that come near the face or ears of the animal.

Feakins U.S. Pat. No. 4,265,876 shows a pesticidally active compound for impregnating an organic polymeric macromolecular ear tag to control insects and ticks on animals such as cattle.

Magee U.S. Pat. No. 3,765,113 shows an animal neck tag for inserting through the neck hide of an animal. Before insertion of the Magee tag into the animal, the tag is dipped in a solution of disinfectant such as Lysol. The Lysol provides protection from infection and provides a lubricant for the easy passage of the Magee tag through the neck hide of the animal.

In contrast to the prior art animal attachment devices, the present invention comprises an antiseptic in a light gel solution that congeals on the animal ear tag to provide an in situ carrier of the antiseptic. The carrier can withstand the normal tag handling so that when the tag is inserted in an animal's ear, the antiseptic in the coating releases from the gel to prevent bacterial infection in the wound in the animal's ear.

SUMMARY OF THE INVENTION

The present invention provides an animal attachment member, such as an ear tag, for attachment to a wound in the flesh of an animal. The tag includes means bearing an antiseptic-containing coating positioned to contact the wound site, the coating being serum-soluble to release the antiseptic at the wound site when contacted with serum from the wound to thereby inhibit bacterial infection.

In a preferred embodiment, the animal tag includes stud means for piercing the ear or other flesh of the animal, the stud bearing the antiseptic-containing coating. The coating desirably is formed by treating the tag, or the wound-contacting portion thereof, with a solution comprising a water-soluble, preferably cellulosic, film former such as hydroxypropyl cellulose carried in a liquid vehicle preferably rich in a rapidly drying alcohol such as ethanol and containing an effective quantity of an antiseptic such as chlorhexidine (typically as the gluconate), and then drying the coating upon the tag.

DESCRIPTION OF THE DRAWING

FIG. 1 is a rear view of an animal tag with an in situ antiseptic coating thereon;

FIG. 2 is a side view of the animal tag of FIG. 1;

FIG. 3 is a sectional view of the portion of the animal tag of FIG. 1;

FIG. 4 is a side view of a stud having an in situ coating of an antiseptic; and

FIG. 5 is a sectional view taken along lines 5—5 of FIG. 4.

DESCRIPTION OF THE PREFERRED EMBODIMENTS

Referring to FIGS. 1 and 2, reference numeral 10 generally designates a typical two-piece tag that can be used as a carrier for an antiseptic. Tag 10 comprises a two-piece animal identification tag made from a soft pliable material such as polyurethane. Although tag 10 is shown as being made of polyurethane, other materials could be used as long as the material can adhere to or encapsulate the tag. One portion of tag 10 contains a panel section 11 containing an animal identification number 20. A neck 14 connects panel section 11 to stud retaining section 12. Stud retaining section 12 includes a fastening shoulder with a recess 20 and opening 21 for engagement with a flanged impaler.

FIGS. 3, 4 and 5 show the relationship of the two-piece tag prior to fastening. Tag 10, which is shown in cross section, has a first recess 20 and a third opening 21 of diameter D. A flanged impaler on stud 25 includes a hollow cylindrical passage 33 with a hard conical impaler tip 30 located on one end of hollow cylindrical passage 33. Conical impaler tip 30 operates to pierce the ear of an animal while hollow cylindrical passage 33 provides a support opening for a blunt tipped forcing tool (not shown). Typically conical impaler 30 may be made from a material such as polycarbonate or the like; however, other suitable materials which have sufficient rigidity to cut the flesh in an animal's ear are also suitable. A softer material 35 such as polyurethane forms stud head 31, stud shank or stem 40 and circular-retaining head 35. The purpose of the softer material is to flex with the animal's ear and minimize the possibility of the animal snagging and tearing out tag 10. Conical impaler tip 30 includes a cylindrical recess (not shown) to form axial alignment and circumferential engagement with an applicator tool. The applicator tool may be a pliers or have a pistol grip type handle that an operator can use to force conical impaler tip 30 through an animal's ear. A two-piece tag for mounting in an animal's ear is more fully shown and described in U.S. Pat. No. 4,209,924.

Located around the base of stud stem 40 is the in situ coating of antiseptic. In the embodiment shown the carrier comprises a ring about 2 millimeters in width around stud stem 40. If more antiseptic is desired in a different location, a second film coating 51 can be applied to stud retaining section 12.

While a two-piece tag is shown as part of the present invention, it will be apparent from the description herein that neither the shape of tag nor the fact the tag is one piece or two piece is significant but the fact that the tag is applied through the flesh in the animal's ear or the like is important since it is the injury to the animal in applying the tag that is likely to cause infection.

The coating formed on the tag or wound-contacting portion thereof comprises a generally dry-to-the-touch coating of a water- and serum soluble polymeric material containing an antiseptic. Hydroxy lower-alkyl celluloses such as hydroxypropyl cellulose are preferred polymers although any biologically acceptable, serum or water-soluble polymer which dries to form a film retaining effective quantities of an antiseptic may be employed. The dry coating is preferably borne by a wound-contacting portion of the tag, such as stud 25. As is common knowledge, wounds in animal flesh normally exude blood, the serum portion of which is largely an aqueous solution; when the serum, accordingly, comes into contact with the coating, the coating slowly dissolves, liberating the antiseptic directly into contact with the wound site to prevent infection. In this manner, the coating continues to liberate the antiseptic for as long as the wound site is open and continues to exude serum. Further, it will now be understood that only that portion of the tag that comes into direct contact with the wound need be thus coated, thereby reducing the expense associated with the coating. As the wound heals and accordingly dries, no further antiseptic is required, and, of course, substantially no further antiseptic is liberated from the coating in the absence of wet serum.

The material that is applied to form a film coating on the tag may be characterized in a preferred embodiment as a liquid solution or suspension at room temperature. For ease of application, the liquid preferably has a viscosity in the range of 600–1000 centipoises at 25° C. As the liquid vehicle of the coating evaporates, the coating congeals to form a bead or ring which contains the antiseptic. The preferred antiseptic is chlorhexidine, which readily kills bacteria without harm to the animal or the person applying the tag. In a preferred process of forming a film coating on the tag, one first prepares a solution of a serum-soluble, film-forming polymer such as hydroxypropyl cellulose in a volatile, liquid alcohol such as isopropyl alcohol. An antiseptic material such as chlorhexidine (preferably as the gluconate) is added to the solution. The in situ coating is quickly dried through rapid evaporation of the volatile alcohol vehicle.

EXAMPLE I

Ten parts by weight of chlorhexidine gluconate (sold under the trademark "Hibiscrub" by Imperial Chemical Industries) at room temperature (70° F.) was mixed with one part by weight of hydroxypropyl cellulose and 89 parts by weight of isopropyl alcohol at room temperature (70° F.). The resulting mixture, although liquid, exhibited thixotropy and had the characteristics of a light gel solution. Next the mixture was applied about the base of stud stem 40 in the form of a ring 50 having an overall thickness on the order of 2 millimeters or more. Within a few seconds after application of the solution, the alcohol in the mixture evaporated causing the solution to congeal. While chlorhexidine gluconate is the preferred material, chlorhexidine by itself or in other forms such as diacetate or dihydrochloride is also suitable for use in the present invention.

The solution, which was applied prior to packaging, produced a film coating that remained on the animal tag for over 12 months.

It should be understood the alcohol provides a rapid evaporation solvent that allows the liquid film to quickly form into a durable coating as the alcohol evaporates.

The liquid vehicle in which the antiseptic material and the water soluble polymeric film-former is employed preferably includes from about 80% to about 100% by weight of a volatile alcohol such as isopropyl alcohol. When the solution has been applied to the tag the volatile, low-boiling alcohol constituent evaporates readily, leaving a film coating with antiseptic dispersed therein. When the vehicle comprises primarily a volatile alcohol such as isopropanol (at least about 80% by weight), then, upon evaporation of the alcohol portion of the liquid vehicle, the coating itself becomes substantially dry to the touch. When the entire liquid vehicle is volatile alcohol, evaportion of the vehicle from the coating occurs quickly—within about five minutes—and the resulting coating is dry to the touch and is soft and pliable. It is believed that the film former absorbs some water from the air. Preferably, the liquid vehicle includes a sufficient concentration of volatile alcohol so that when the alcohol moiety evaporates, the film is rendered substantially dry to the touch.

The preferred coating composition of the invention generally takes the form of a lightly viscous, pourable liquid. It is believed that some light gel formation occurs due to the presence of the cellulosic film former. Of interest, higher temperatures appear to increase rather than decrease the viscosity of the composition. The viscosity of the solution can also be controlled through judicious selection of the type and quantity of cellulosic film former, and also through the addition of various thickening agents such as fumed silica (e.g. Cab-o-Sil, a product of Cabot Chemical Company).

Under most ear tag application conditions the preferred range of the film forming, water soluble cellulosic material, typically hydroxypropyl cellulose, in the solution varies from a minimum of approximately 0.2% by weight to a maximum of approximately 20% by weight depending on the thickness of the coating desired. If the concentration of hydroxypropyl cellulose is very low, it produces a thin film coating which may break or rupture or even be incompletely applied to the ear tag. On the other hand, if the mixture is too thick, i.e., if concentrations of hydroxypropyl cellulose are greater than about 20% by weight, it is difficult to apply the mixture to the ear tag. Thus, the range of hydroxypropyl cellulose has as its limit the practical range at which it can be applied to the ear tag. However, it has been found the preferred amount of hydroxypropyl cellulose for most applications ranges from a minimum of about 0.2% by weight to a maximum of about 20% by weight. Under most conditions this range of hydroxypropyl cellulose by weight produces a film of sufficient durability to last during the handling and application of the tag to the animal's ear up to the point when healing is substantially complete.

It is preferred that the amounts of the antiseptic are such that they are effective over a minimum of three months or more although the most critical period is the first 48 hours after application. While more or less antiseptic can be used, the preferred range of chlorhexidine gluconate as the antiseptic ranges from a maximum of approximately 10% by weight to a minimum of about 5% by weight. It should be understood that other antiseptics may be used at greater or lesser concentrations; however, it has been found that chlorhexidine gluconate is ideally suited since it can be retained in the film to provide long-lasting antiseptic action.

While hydroxypropyl cellulose is the preferred material, other cellulosic film formers such as ethyl cellulose or methyl cellulose may also be used. In order to test the effectiveness of the in situ coating, tests were conducted with the tag coated with the solutions described in the following examples.

EXAMPLE II

The ear tag studs described above bearing coatings containing the antiseptic chlorhexidine in a hydroxpropyl cellulose carrier were compared to control studs without disinfectants to determine their ability to inhibit bacterial growth. Three strains of bacteria were used, *E. Coli, Staph aureus* and *Staph epidermis*. The test bacteria were inoculated into 50 ml tryptose broth. After six hours one ml of the six hour broth- culture was used to inoculate 25 ml of 45° C. tryptose agar. The agar was then poured into 100 mm petri dishes containing ear tags with a film coating of hydroxypropyl cellulose and an antiseptic of chlorhexidine dispensed therein and the test control studs containing no antiseptic. The petri dishes prepared as in Example I and tags were allowed to cool at room temperature and then incubated at 37° C. After 24 hours of incubation the radial zones of bacterial inhibition surrounding the stud were measured. The following table lists the approximate diameter of the radial zones of bacterial inhibition surrounding the stud for various concentrations of antiseptic and for the control studs containing no antiseptic.

| Solution | DIAMETER ZONES OF BACTERIAL INHIBITION | | |
|---|---|---|---|
| | Staph Aures | Staph Epidermidis | E. Coli |
| A | 26 mm | 33 mm | 30 mm |
| B | 55 mm | 58 mm | 51 mm |
| Control Stud (both solution A & B) | 0 | 0 | 0 |

As expected, the control studs with no antiseptic showed no zones of bacterial inhibition while the radial zones of bacterial inhibition around the test studs were generally proportional to the concentration of the antiseptic in the coating solutions. Coating solution A contained 1% chlorhexidine gluconate and coating solution B contained 5% chlorhexidine gluconate. Both contained approximately 20% by weight of hydroxypropyl cellulose with the balance isopropyl alcohol.

EXAMPLE III

A solution was made in accordance with Example I except that hydroxypropyl cellulose was increased to four parts by weight with the isopropyl alcohol decreased to 85 parts by weight. The increase of hydroxypropyl cellulose resulted in an increased viscosity and an increased coating thickness when applied to the stud.

EXAMPLE IV

The solution was made in accordance with Example I however the chlorhexidine gluconate was varied from 0.5 parts by weight to 20 parts by weight with the alcohol increased while the amount of hydroxypropyl cellulose was held constant at one part by weight. The amount of chlorhexidine gluconate had no noticable effect on the application or congealing of the solution.

EXAMPLE V

The solution was made in accordance with Examples III and IV except the hydroxypropyl cellulose was varied from a low of 0.2 parts by weight to a maximum of 20 parts by weight with the isopropyl alcohol content varied in direct amount to change in hydroxypropyl cellulose. The only noticeable difference was that the greater concentration of hydroxypropyl cellulose produced a thicker coating.

While chlorhexidine was used in the form of chlorhexidine gluconate, it should be understood that in certain applications the chlorhexidine in powder form could also be used since it is the antiseptic qualities of the chlorhexidine that are required to inhibit bacterial infections.

As an alternate embodiment to forming an antiseptic-containing film coating on the exterior of the tag, the film forming material and the antiseptic may be incorporated into the micromolecular structure of certain polymers. That is, biologically acceptable polymers may have a sufficiently large molecular weight and multiplicity of sites to enable absorption or absorption of the film containing the antiseptic. Examples of such macromolecular structures have been made from silicone. Still other types of macromolecular structure are shown in Feakins U.S. Pat. No. 4,265,876, the teachings of which are incorporated herein by reference.

Although in the preferred embodiment a ring of antiseptic is applied around the stud, it has been found that dipping or spraying the entire stud or tag with the solution is also an effective bacterial inhibitor. For some applications such an application is preferred since a coating of the entire stud or tag reduces the chances of rain or moisture washing off the water-soluble polymer. That is, if the water-soluble polymer and antiseptic are applied to the stud, one is assured that the antiseptic is actually inserted into the wound where it can be released by the serum exuded from the wound.

If desired, a pigment can be incorporated into the solution along with a UV absorber to prevent ultraviolet degradation of chlorhexidine gluconate. As an alternate to incorporation of pigments and UV absorbers, the tags can be packed in opaque containers which prevent the ultraviolet light from degrading the chlorhexidine gluconate.

We claim:

1. An animal tag for attachment to a wound in an animal with said tag characterized in that at least a portion of the tag positioned to contact the wound contains a dry, water-soluble cellulose film coating containing effective quantities of an antiseptic for inhibiting bacterial infections in the wound.

2. The invention of claim 1 wherein said tag includes a stud for piercing an animal's ear with said cellulose film coating containing said antiseptic located around said stud.

3. The invention of claim 2 wherein the antiseptic comprises chlorhexidine gluconate.

4. The invention of claim 3 wherein the cellulose film coating contains a liquid vehicle and the chlorhexidine gluconate ranges from about 0.5 to about 10% by weight of the cellulose film coating.

5. The invention of claim 2 wherein said cellulose film coating comprises a ring of approximately 2-4 mm thickness located around said stud.

6. The invention of claim 5 wherein the total weight of said cellulose film containing antiseptic on said tag is less than 0.2 grams per tag.

7. The invention of claim 1 wherein the cellulosic film comprises hydroxypropyl cellulose.

8. An animal tag for attachment to a wound in the flesh of an animal, the tag including means bearing a dry durable antiseptic-containing coating positioned to contact the wound, the coating being serum-soluble to release the antiseptic at the wound site when contacted with serum from the wound to thereby inhibit bacterial infection.

9. An animal tag for attachment to a wound in an animal with said tag comprising a biologically acceptable polymer wherein a dry, serum-soluble cellulose film-forming material containing effective quantities of an antiseptic is incorporated into the micromolecular structure of the polymer.

10. A tag according to claim 9 wherein the antiseptic is chlorhexidine.

11. A tag according to claim 10 wherein the polymer is a silicone.

* * * * *